United States Patent [19]

Marsh et al.

[11] Patent Number: 5,313,842
[45] Date of Patent: May 24, 1994

[54] PUMP STATION FLOWMETER WITH SUDDEN HIGH INFLOW CHANGE DETECTOR

[75] Inventors: Lawrence B. Marsh, Buckeystown; John D. Wright, Gaithersburg, both of Md.

[73] Assignee: Marsh-McBirnes, Inc., Frederick, Md.

[21] Appl. No.: 815,756

[22] Filed: Jan. 2, 1992

[51] Int. Cl.$^5$ .............................................. G01F 3/38
[52] U.S. Cl. ........................................ 73/861; 73/223
[58] Field of Search ................ 73/861, 198, 223, 224; 417/20, 63

[56] References Cited

U.S. PATENT DOCUMENTS

| | | |
|---|---|---|
| 4,120,033 | 10/1978 | Corso et al. |
| 4,370,098 | 1/1983 | McClain et al. |
| 4,455,870 | 6/1984 | Jorritsma . |
| 4,467,657 | 7/1984 | Olsson . |
| 4,481,827 | 11/1984 | Bilstad et al. ........................ 73/861 |
| 4,522,059 | 6/1985 | Rodde et al. |
| 4,669,308 | 6/1987 | Jorritsma . |
| 4,741,208 | 5/1988 | Vandevier . |
| 4,781,525 | 11/1988 | Hubbard et al. |
| 4,821,580 | 4/1989 | Jorritsma . |
| 4,918,995 | 4/1990 | Pearman et al. ................ 73/204.26 |

FOREIGN PATENT DOCUMENTS 1291571 10/1991 Canada .

OTHER PUBLICATIONS

Dillon et al, Predicting Flowrates From Positive-Displacement Rotary Pumps, Jul. 22, 1985, pp. 98, 99, 100 and 101.

Michael Adcock, The Multiple Benefits of Innovative Collection System Instrumentation May, 1991, pp. 10–14, Operations Forum.

INVENTRON, Farmington Hills, Mich., brochure, pp. 2–15.

Milltronics, Inc., literature.

Specification written for City of Baton Rouge, La., for ADS equipment, pp. 13615-12 to 13615-14.

"Pumping Station Monitoring System, Reference Manual", BHF Research Ltd. (Complete Copy) Aug., 1989.

Primary Examiner—Herbert Goldstein
Attorney, Agent, or Firm—Laubscher & Laubscher

[57] ABSTRACT

A pump station flowmeter is disclosed including a sudden high inflow change detection circuit for eliminating from a series of emptying characteristic calculations taken over a period of time those measurements which are outside of a predetermined acceptance range. The wet well dimensions, level detector signals, clock signals and pump status signals are supplied as inputs to both a volume rate of change calculator and to the sudden high inflow change detector. In the event of an undesirable measurement, the sudden high inflow change detection circuit operates a gate to isolate the volume rate of change calculator from the emptying characteristic calculator that calculates outflow. A flow integrator is provided for calculating volume per cycle from the volume rate of change signal, and an inflow calculator serves to produce inflow from the volume per cycle signal.

13 Claims, 8 Drawing Sheets

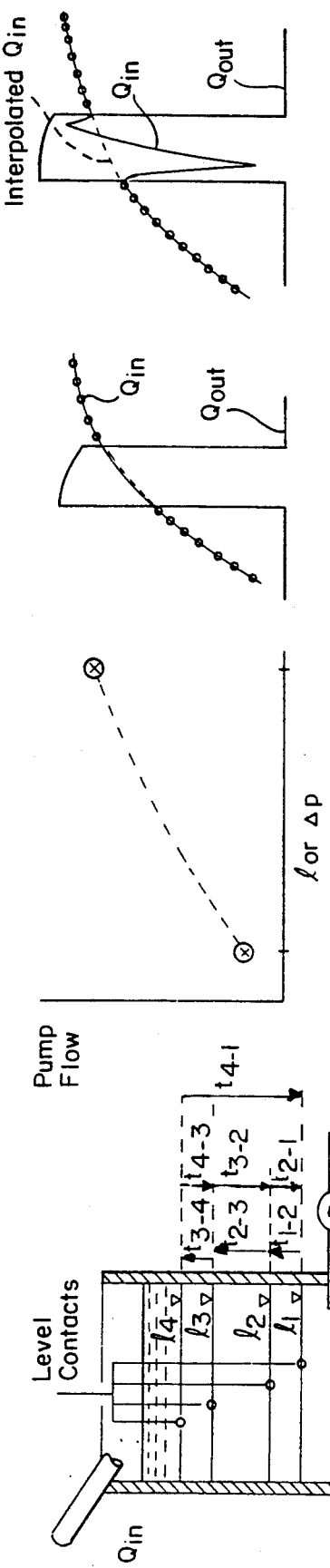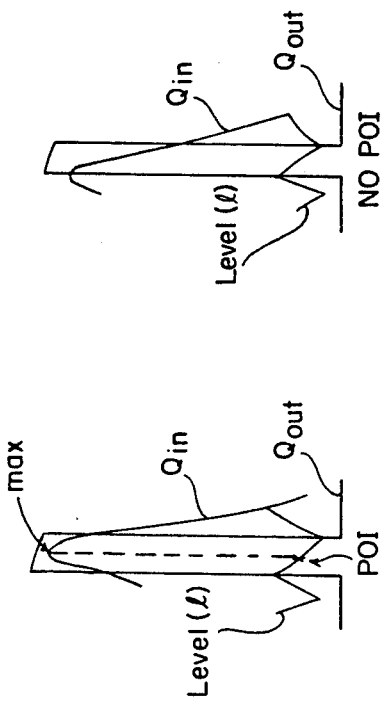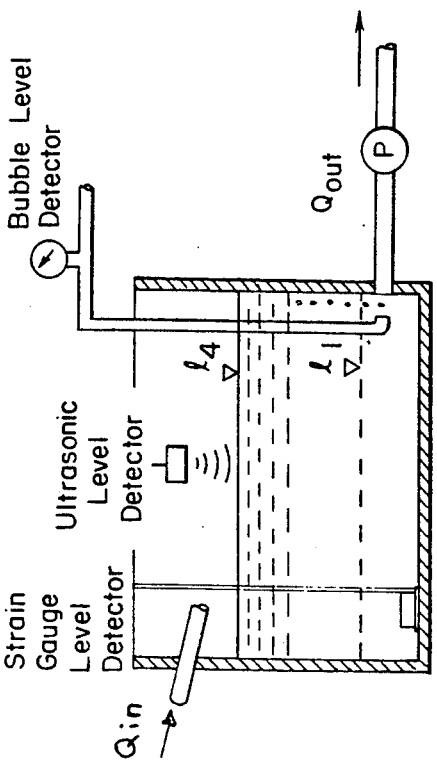

PUMP STATION FLOWMETER WITH SUDDEN HIGH INFLOW CHANGE DETECTOR

STATEMENT OF THE INVENTION

A pump station flowmeter is disclosed which includes a sudden high inflow change detector for eliminating from a series of emptying characteristic calculations taken over a period of time those measurements that are outside of a predetermined acceptance range.

BRIEF DESCRIPTION OF THE PRIOR ART

Pump station flowmeters or the like are well known in the patented prior art, such as the patent to Jorritsma U.S. Pat. Nos. 4,455,870, 4,669,308 and 4,821,580; Free et al No. 4,897,797, Hon No. 4,856,343, Adney No. 4,962,666 and the British patent No. 777,201.

Pump stations are comprised of a wet well which accepts liquid inflow and temporarily stores such inflow, and a pump or pumps which discharge the accumulated liquid from the wet well. The rate of change of level in the wet well with respect to time (dl/dt) is a function of the shape and size of the wet well, the flow entering the wet well (inflow or $Q_{in}$), and the flow leaving the wet well (outflow or $Q_{out}$).

The shape and size of the wet well are known, and therefore if dl/dt is measured, it can be converted to the rate of change of volume with respect to time (dV/dt). The rate of change of volume depends on the inflow and outflow as follows:

$$dV/dt = Q_{in} - Q_{out} \qquad (1)$$

Equation 1 can be rearranged to depict that if dV/dt and the inflow are known, the outflow can be calculated, or if dV/dt and the outflow are known, the inflow can be calculated. When the wet well pump (or pumps) are off, the outflow is known to be zero, and dV/dt is a direct measure of the inflow.

While the pump (or pumps) are off, the inflow can be measured by timing how long it takes for the inflow to fill a known volume. This can be done by using existing upper and lower limit switches which are already present to turn the pumps on and off. This method simply provides an average inflow over the time that it takes to fill the known wet well volume.

If the inflow is also known during the pump on time, the total volume passed through the wet well in one wet well pump cycle can be calculated by the equation:

$$\text{Volume/cycle} = V_{1\text{-}4} + \int_{t_{4-1}} Q_{in}(t)dt \qquad (2)$$

where $V_{1\text{-}4}$ is the volume of the wet well between the pump on and pump off switches and $t_{4\text{-}1}$ is the length of time that the pumps were on. It is important to note that the inflow is a function of time and is not a constant. If an average inflow for the pump on time is what is known, then a numerical version of equation 2 would be used:

$$\text{Volume/cycle} = V_{1\text{-}4} + (\overline{Q_{in}})(t_{4\text{-}1}) \qquad (3)$$

Unfortunately, timing the wet well fill up will give an average inflow which is not an accurate estimate of inflow during the pump on time if the inflow is significantly increasing or decreasing between the pump off time and pump on time. One way to reduce this error is to add another level switch at an intermediate level to define another, smaller volume. The fill time of this intermediate volume can be used to measure an average inflow over a shorter period of time which is closer to the onset of the pump on time, and hence is a better estimate of the inflow during the pump on time.

Variations on this idea include measuring fill times before and after the pump on time and averaging the resulting inflows, or adding more intermediate level switches to measure several inflows and then performing a best fit of the inflow versus time for interpolation and averaging. Although these techniques improve the system's performance, sudden flow changes will still lead to large errors.

None of the methods of the prior art has the ability to detect whether or not a sudden change in the inflow has occurred while the pump was on. Therefore, flows which change at a high frequency can cause large errors in the pump station flow measurements when prior art techniques are used. High frequency inflows are flows which change a significant amount over a short period of time, making it difficult (or impossible) for a system which samples the flow periodically to obtain an accurate estimate of the inflow during the pump on time. For example, if we assume that the flow changes periodically, and that the system samples the inflow once per pump cycle, then the inflow frequency must be less than half the pump frequency for there to be any hope of the system accurately determining how the inflow is varying. This requirement is known as the Nyquist limit. High frequency flows are likely to occur at pump stations downstream of another pump station or at industrial pump stations. Small domestic pump stations will have high frequency phenomena as well.

All previously designed systems which time discrete level changes and sample the inflow a finite number of times per cycle have a common pattern of errors as the frequency of inflow increases. Examining the behavior of a system exposed to a periodically varying flow, changing the frequency, and checking the errors is illustrative. At inflow frequencies well below the Nyquist limit, errors are acceptably small. As the Nyquist limit is approached, errors increase dramatically and are large enough to be considered unacceptable. At a certain frequency a maximum error is reached, and beyond that frequency, errors decline. The errors decline because there are many inflow cycles occurring during the sampling period and the averaging that is inherent to the method results in relatively small errors.

A method disclosed in the Jorritsma U.S. Pat. No. 4,455,870 samples the inflow once per pump cycle, and a second method samples the inflow twice per pump cycle and therefore it can work accurately at twice the inflow frequency as the first method. Adding more intermediate switches allows a system to measure the volume through the wet well accurately at even higher inflow frequencies. However, it is not practical to measure high frequency inflows in this manner because too many switches are required.

One important phenomenon of periodic flow entering a pump station can be termed "lock-on". Lock on occurs when the pump on time and the inflow peaks synchronize and remain that way. Lock on maximizes the errors in flow measurement systems which use fill times to estimate the inflow during the pump on time. The occurrence of lock on is affected by the size of the wet well, the inflow frequency, the inflow magnitude, and the pump characteristics. It occurs very easily over a relatively wide range of frequencies. Such frequency conditions often exist downstream of another pump station or at relatively small pump stations.

Once a pump station is locked on, it will remain so until the inflow frequency changes enough to disturb it. The tendency of the pump on time and the maximum inflow to remain locked in phase can be explained as follows. At low inflows, the pump is less likely to come on because the level is less likely to reach the top level switch. Conversely, the pump is more likely to come on when the inflow is high. This tendency forces the pump to turn on during the increasing part of the inflow cycle. The pump on time lengthens because of the increasing inflow. Ultimately the pump on time straddles and then passes the inflow peak. Once the pump on time occurs during the period of decreasing inflow, the pump flow is large enough to empty the wet well before the inflow reaches its minimum. At this point the two cycles are locked in phase and the pump on time will not advance across the inflow minimum. Under these conditions, inflow estimates based on prior fill time data will be highly inaccurate.

These problems are overcome by using a different approach. If the outflow of the pump (or pumps) is known, the volume passing through the wet well in one pump cycle can be calculated by:

$$\text{Volume/cycle} = \int_{t_4-1} Q_{out}(l \text{ or } \Delta p) dt \qquad (4)$$

The outflow is not a constant, but varies over time as the level (l) of the wet well or the pressure difference ($\Delta p$) between the inlet and outlet sides of the pump changes. Flow through a tank outlet (either gravity or pumped flow) depends on the pressure difference between the intake and discharge sides ($\Delta p$). A plot of the flow versus the pressure difference between the inlet and outlet is known as pump performance curve (see FIG. 9) and this is one possible version of the emptying characteristics. For instance, for a constant pressure on the outlet side, pumps output more flow when the level in the wet well is high than when the lever in the wet well is low.

In most cases, wet well pumps discharge into an open channel pipe which carries the liquid downstream by gravity: the pumps simply lift the water a constant distance from the pump outlet to the elevation of the open channel pipe. If the pumps discharge to a gravity feed line, then the pump outlet is under a constant pressure due to the column of water between the pump outlet and the beginning of the open channel flow line. The pressure on the inlet side of the pump is directly related to the level of the liquid in the wet well. Hydrostatic pressure equals the liquid density times the gravitational constant times the liquid level. In this case the level of the liquid in the wet well by itself is sufficient for description of the emptying characteristics. If the pump discharges to a pressurized pipe, then the pipe pressure will vary depending on the conditions downstream including whether more than one pump is running at the same time. Therefore, in these cases it is necessary to measure the pressure on the outlet side of the pump and develop the emptying characteristics as a function of the pressure difference instead of the level alone.

In pump stations which use variable speed pumps, the emptying characteristics must be developed as a function of the pump speed as well as the wet well level (or differential pressure). The pump speed may be indicated by any quantity which has a one to one correspondence with the revolution speed of the pump impeller and may come from a tachometer or a meter which measures the electric current flowing to the pump motor. The extensions required for a system with more than one pump make it necessary to know which pump is on or off.

The method outlined by Jorritsma in U.S. Pat. No. 4,821,580 estimates the pump flow based on pressure differences measured across the pump (or the wet well level), and pump flow characteristics supplied by the pump manufacturer or from a calibration run. Because this method does not attempt to either measure or estimate inflow rates, it avoids high frequency inflow errors, and hence they do not effect the outflow measurement. However, the volumes from this method will be wrong if the pump characteristics used are wrong or if they change over time.

The present invention was developed to avoid the above and other drawbacks of the prior systems.

SUMMARY OF THE INVENTION

Accordingly, a primary object of the present invention is to provide an improved pump station flowmeter in which a sudden high inflow change detector is provided for eliminating erroneous emptying characteristics that are outside of a predetermined acceptance range. The sudden high inflow change detector controls gate means arranged between a volume rate of change calculator and an emptying characteristic calculator. Various forms of the emptying characteristics for a wet well include volume through the wet well per cycle versus the pump on time, wet well fill time versus pump on time, average pump flow or outflow, and outflow as a function of level or pressure across the pump (in a continuous level method).

According to a further object of the invention, flow integrator means are connected with the output of the emptying characteristic calculator, thereby to give an indication of volume per cycle, and an inflow calculator may also be provided for indicating inflow.

According to a more specific object of the invention, if the basic system with one upper switch and one lower switch is present, measurements of the average outflow from the most recent wet well cycle ($\overline{Q_{out}}$) are compared to the average outflow over multiple cycles ($\overline{\overline{Q_{out}}}$) and values which differ by more than a specified tolerance from the multiple cycle average are considered to be influenced by sudden high changes in inflows. These values are excluded from the emptying characteristics calculator so that sudden high changes in inflows will not cause errors in the emptying characteristics used by the system. Additionally, if one or more intermediate level switches are available, comparisons of inflow between the beginning and end of the wet well fill time are made to check for the occurrence of lock-on.

According to another object of the invention, a continuous level system is disclosed including a level sensor which continuously outputs the liquid level in the wet well. At low sudden changes of inflow, the system interpolates inflow and uses the interpolation to develop the emptying characteristics. At high changes of inflow, the more rapid changes in inflow are detected by examining the second derivative of level with respect to time and checking for a point of inflection (POI) in the level versus time. When the high changes of inflow are detected, inflow interpolations are not used and the volume of liquid through the wet well is calculated from the previously determined emptying characteristics.

The metering systems described are oriented towards pump stations, but the techniques are applicable to any situation where flow is stored and periodically discharged from the storage volume. For example, flow stored behind a dam and released by opening a valve would be an applicable situation. The outflow is still a function of the level or pressure difference across the valve and the only difference is that the flow is discharged due to gravity, not a pump, and pump status becomes whether the valve is open or closed or what percent open the valve is.

BRIEF DESCRIPTION OF THE DRAWING

Other objects and advantages of the invention will become apparent from a study of the following specification when viewed in the light of the accompanying drawing in which:

FIG. 6 is a diagrammatic representation of a wet well flow measuring system including multilevel detector means;

FIG. 7 is a block diagram of a wet well flowmeter system including the multilevel detector inputs of FIG. 6 for measuring outflow, and including sudden high change of inflow detection with lock on;

FIGS. 9–11 illustrate a typical pump curve as well as the effects of sudden high changes of inflow on the methods for interpolating inflow:

FIG. 12 illustrates a wet well flowmeter system having continuous level measuring means;

FIGS. 15 and 16 are illustrations regarding the method for detecting sudden high change of inflows by detecting a point of inflection (POI).

DETAILED DESCRIPTION

Figure 1:
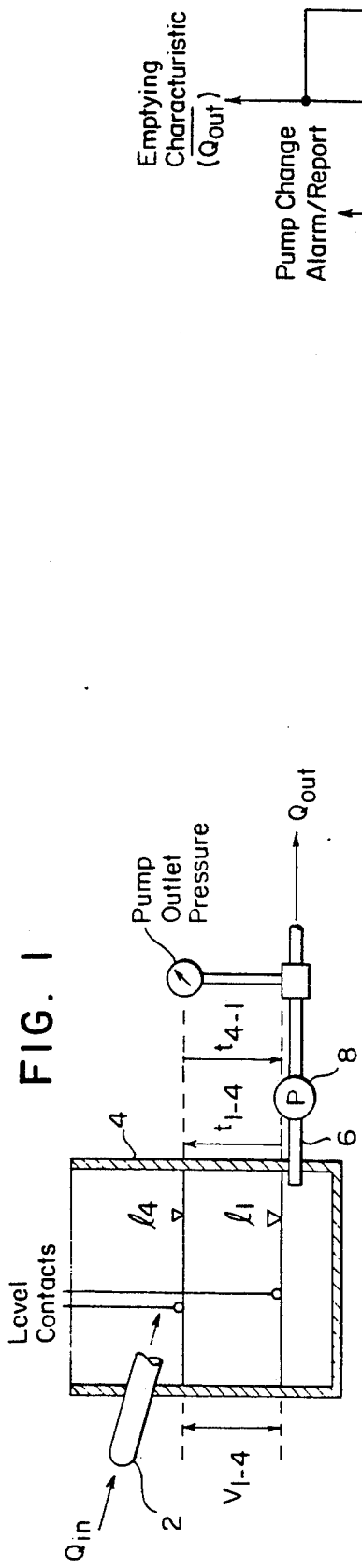
FIG. 1 is a diagrammatic representation of the wet well pumping system of the present invention.

FIG. 1 illustrates by a diagram the inflow of liquid ($Q_{in}$) from source 2 into the wet well 4 having a outlet 6 from which fluid is pumped by pump 8 to provide outflow ($Q_{out}$). Level contacts $l_1$ and $l_4$ indicate lower and upper liquid levels in the wet well, time $t_{1-4}$ indicating the time required for the liquid level to increase by the inflow from level 1 to level 4, and time $t_{4-1}$ indicating the time required for the liquid level to decrease by the outflow from level 4 to level 1.

Various emptying characteristics of the wet well normally of interest include:

(1) Volume through the wet well per cycle versus pump on time;

(2) wet well fill time versus pump on time;

(3) average pump flow (outflow or $Q_{out}$); and (4) outflow as a function of wet well level (1) or pressure across the pump inlet and outlet ($\Delta p$) ($Q_{out}(1$ or $\Delta p)$). This is sometimes called a pump performance curve.

Two Switch Method

Figure 2:
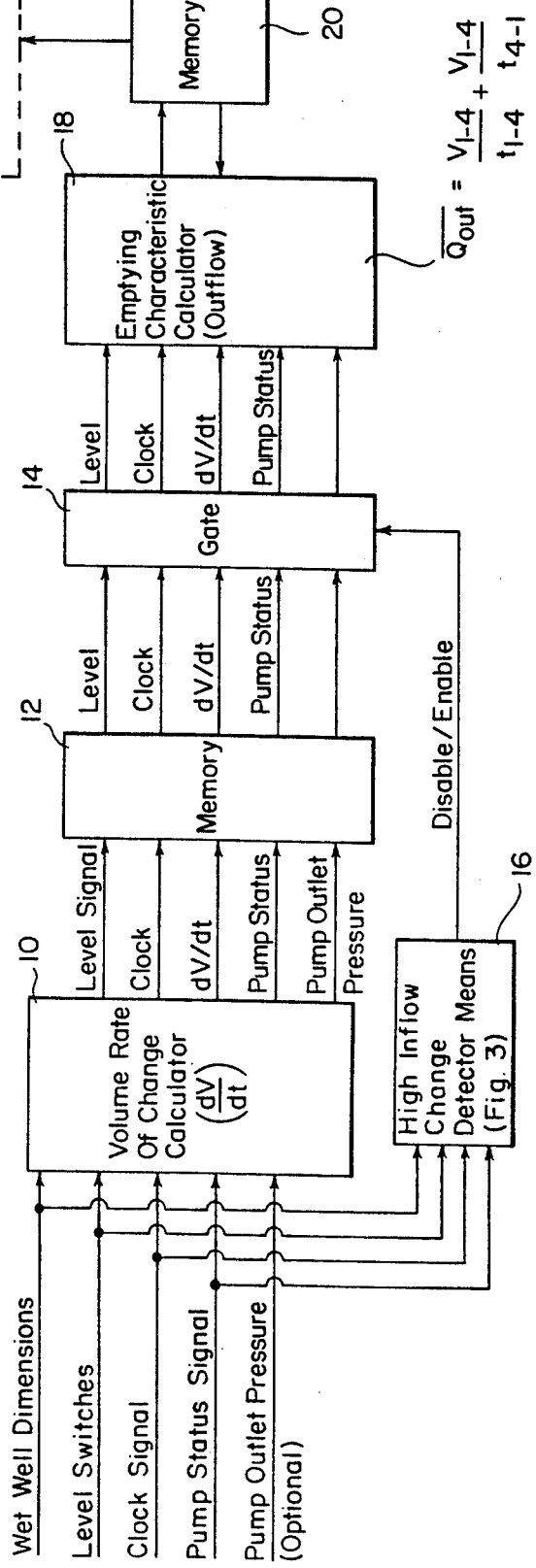
FIG. 2 is a block diagram of a basic first embodiment of the invention using a two-switch method.

The circuit of FIG. 2 discloses a system according to the present invention for obtaining outflow ($Q_{out}$) by the use of the basic apparatus of FIG. 1. The system obtains an inflow estimate by measuring the fill time of the wet well. Average outflow is calculated and sudden high changes in inflows are detected by comparing the most recently calculated outflow to the average of many previous outflow calculations.

Inputs to a volume rate of change calculator 10 (which measures dV/dt) include the wet well dimensions, the level switch inputs, clock, pump status, and pump outlet pressure (if the pump outputs to a pressurized pipe). The volume rate of change signal (dV/dt), together with the level switch inputs, the clock signal, pump status, and pump outlet pressure signal, are supplied to memory 12, and to the inputs to gate 14.

The pump status input signal relates to whether the pump is on or off, and also which pump is on or off. Pump status includes percent of maximum speed for variable speed pumps. An additional input is the pump outlet pressure, and this input is optional and is passed on along with the other input data. The pump outlet pressure is necessary in cases where the pump or pumps output flow to a pressurized pipe. In these cases, the emptying characteristics must be defined as a function of the differential pressure across the pump ($\Delta p$). If the pump or pumps discharge to a gravity feed line, then the level on the inlet side of the pump is sufficient for description of the emptying characteristics.

According to a characterizing feature of the invention, the operation of gate 14 is controlled by sudden high change of inflow detector means 16 having inputs that are connected with the same inputs as the volume rate of change calculator (with the exception of pump outlet pressure). As will be described in greater detail below with regard to FIG. 3, the sudden high change of inflow detector means serves to eliminate extraordinary signals that are outside of an acceptable deviation range, which signals would otherwise affect the accuracy of the emptying characteristic being measured. Signals that are within the acceptable deviation range are supplied to the emptying characteristic calculator 18, which calculates the average outflow for the pump on time. The formula for calculating the outflow by this method is derived as follows:

The volume which passes through the wet well in one pump cycle can be calculated by multiplying the average inflow during the pump on time ($Q_{in}$) by the length of time the pump is on ($t_{4-1}$) and adding this volume to the volume held by the wet well between the two level switches ($V_{1-4}$), as given in equation 3. The average inflow during the pump on time can be estimated based on measurements made during the wet well fill time. Average inflow during the fill time is calculated by dividing the volume of the wet well by the length of time it took to fill the wet well:

$$\overline{Q_{in}} \sim V_{1-4}/t_{1-4} \qquad (5)$$

by substitution into equation 3:

$$Volume/cycle = (V_{1\text{-}4}/t_{1\text{-}4})(t_{4\text{-}1}) + V_{1\text{-}4} \quad (6)$$

and the average outflow during the pump on time ($\overline{Q_{out}}$) can be calculated from the formula:

$$\overline{Q_{out}} = (Volume/cycle)/t_{4\text{-}1} = V_{1\text{-}4}/t_{1\text{-}4} + V_{1\text{-}4}/t_{4\text{-}1} \quad (7)$$

The output from calculator 18 communicates back and forth with memory 20 to store the wet well emptying characteristics calculated by calculator 18. The memory also communicates with an optional emptying characteristics analyzer 22. The purpose of the emptying characteristics analyzer is to provide the user with alarms and/or reports that describe how the pump characteristics have changed over time. By analyzing the data in the memory 20 against pre-set conditions that have been input by the user into the analyzer 22, the reports can either give alarms or descriptive data or graphs on how the pump characteristics have been changing with time. The analyzer may also be programmed to remove old pump cycle data from memory 20 when it is no longer of interest. The emptying characteristic analyzer 22 has two outputs, the emptying characteristics and the pump change alarm/report.

Figure 3:
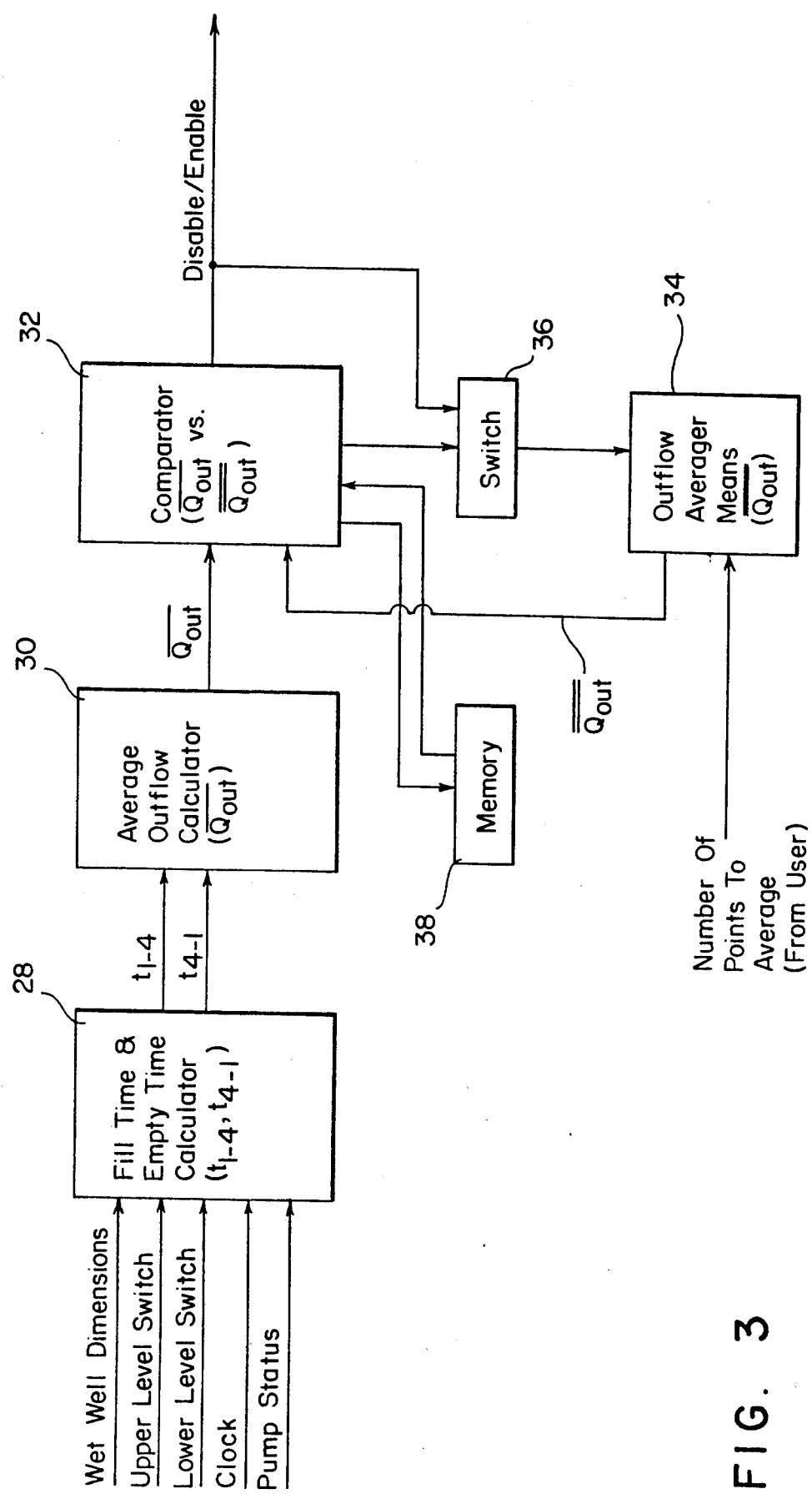
FIG. 3 is a block diagram of the sudden high change of inflow detector circuit of FIG. 2.

Referring now to FIG. 3, the purpose of the sudden high inflow change detector 16 of FIG. 2 is to analyze and reject data when its analysis indicates that the measured inflows will not lead to accurate estimates of the inflow during the pump on time within a given range of accuracy. Thus, the sudden high inflow change detector 16 of FIG. 3 calculates the average pump outflow from the pump fill time and empty time ($t_{1\text{-}4}$ and $t_{4\text{-}1}$) using the equation 7. If the average outflow calculated from the most recent pump cycle deviates by more than a user-inputted error tolerance from the average outflow of many previous pump cycles, then data is not allowed to pass through gate 14 owing to the enable/disable signal from detector 16. Therefore, the high frequency detector determines which data is used in the emptying characteristics calculations and which is not. Contained within the sudden high inflow change detector module 16 is the ability to discard data that is quite old so that it is not used in the determination of the multiple cycle average outflow used by the comparator 32. In other words, it is always necessary to have a reasonable sampling of data cycles (say, for example, 100), and as newer good points are obtained, the older data points are thrown away so that one can more properly track the current emptying characteristics. The removal of older points could be user controlled.

The fill time and empty time calculator 28 accepts inputs from the level switches, time from a clock, the wet well dimensions, and the pump status. From the inputs, the wet well fill time ($t_{1\text{-}4}$) and empty time ($t_{4\text{-}1}$) are calculated. The average outflow for the pump on time is calculated from the fill time and empty time by calculator 30, and the average outflow for the most recent cycle is forwarded to comparator 32.

Comparator 32 compares the most recent average outflow ($\overline{Q_{out}}$) to the average outflow averaged over many wet well cycles ($\overline{\overline{Q_{out}}}$). The purpose of this comparator is to exclude data from sudden high inflow change inflows which are likely to lead to errors if used to find the emptying characteristics. The number of outflow averages which are to be averaged together is input by the user or manufacturer to outflow averager means 34. The system may keep this number of values in memory, dropping the oldest value each time a new value is accepted. Also the user or manufacturer may enter an error tolerance which is used by the comparator 32 to decide whether the most recent value is acceptable or not. If the most recent average outflow is not acceptable, then comparator 32 outputs a disable signal so that the current data is not used to update the emptying characteristics. Also, the disable signal is used to open switch 36 and prevent the most recent average outflow from being averaged in averager 34.

The enable/disable signal from sudden high inflow change detector 16 prevents data which is effected by sudden high inflow change inflows from reaching the emptying characteristics calculator 18. The emptying characteristics calculator 18 and memory 20 output the average outflow for the pump.

Two Switch Method with Flow Integrator

Figure 4:
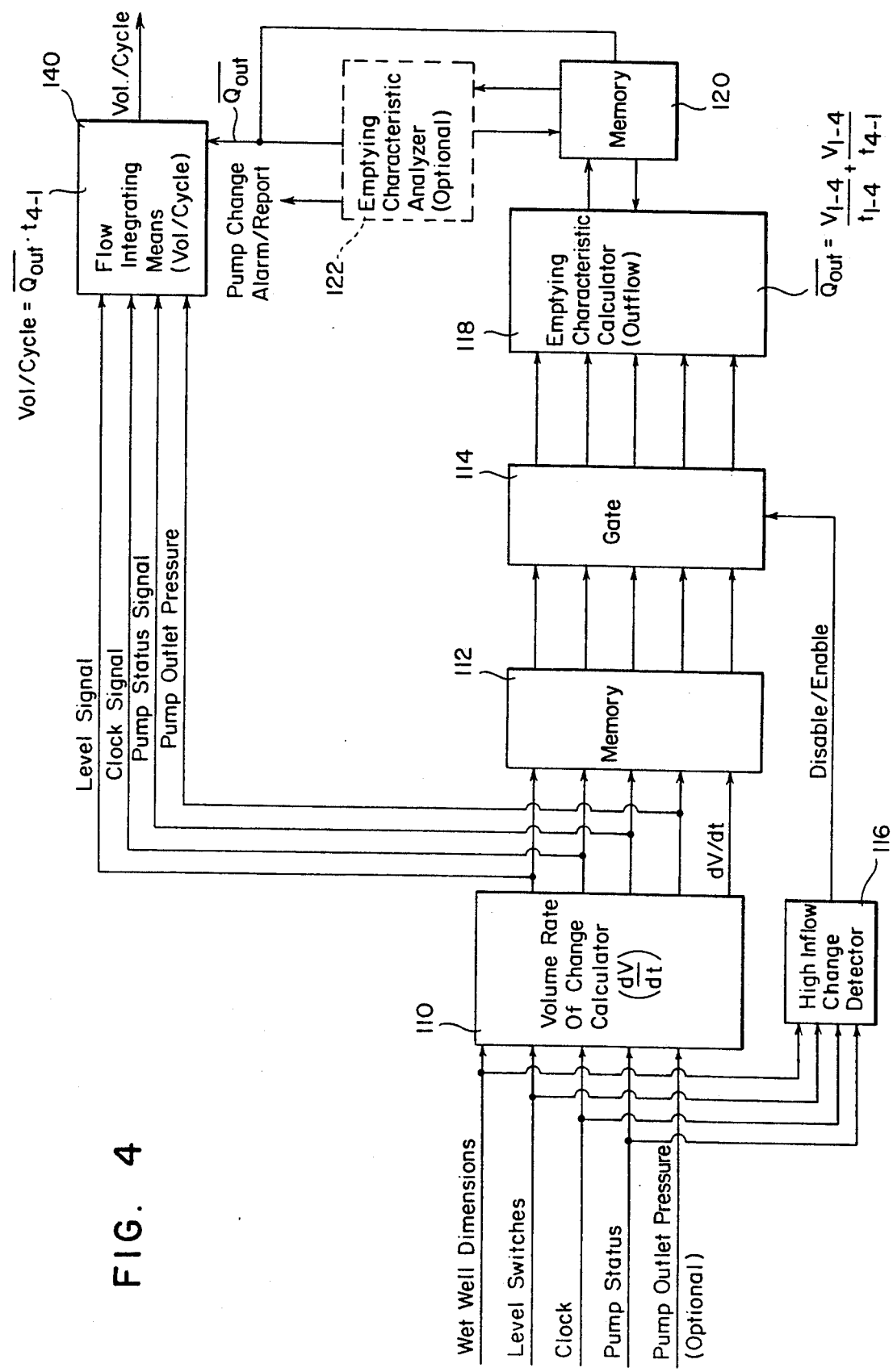
FIG. 4 is a block diagram of a second embodiment of the invention using a two-switch method and including flow integrating means.

Referring now to FIG. 4 (which is a modification of the embodiment of FIG. 2 and uses like reference numerals for similar components), flow integrating means 140 are provided for calculating the volume through the wet well from the emptying characteristics. The output of flow integrating means 140 is the volume through the pump station for each cycle, so it combines the emptying characteristic from either memory 120 or analyzer 122 with the pump status signal and the clock signal. The flow integrator forms the product of the emptying characteristic ($\overline{Q_{out}}$) and the pump on time ($t_{4\text{-}1}$), thereby performing a numerical version of the integral shown in equation 4 of the following form:

$$Volume/cycle = \overline{Q_{out}} \cdot t_{4\text{-}1} \quad (8)$$

Two-Switch Method With Flow Integrator and Inflow Calculator

Figure 5:
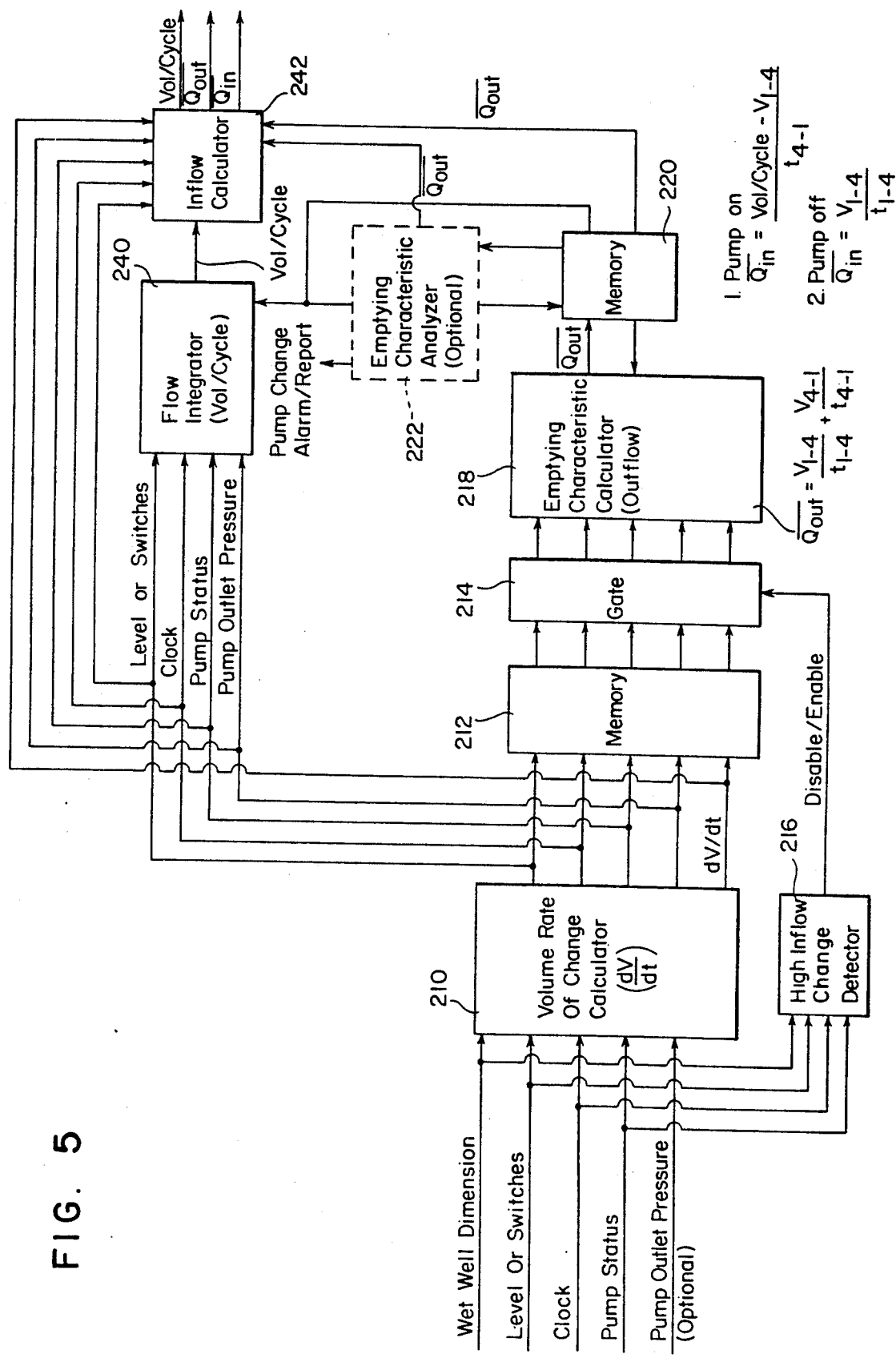
FIG. 5 is a block diagram of a modification of the embodiment of FIG. 4 including inflow calculator means.

Referring now to the modification of FIG. 5, there is additionally provided an inflow calculator 242 having as inputs level, clock, dV/dt (change in volume with respect to time), the pump status, the volume per cycle from flow integrator 240, and the emptying characteristics from either memory 220 or from analyzer 222. Additionally, the pump outlet pressure may be optionally provided when the outlet pipe is pressurized. Based on these inputs, the inflow calculator delivers the volume per cycle, the outflow, and the inflow.

Inflow is calculated during the pump on time in accordance with the formula:

$$Q_{in} = (Volume/cycle - V_{1\text{-}4})/t_{4\text{-}1} \quad (9)$$

and pump-off inflow is calculated by the formula:

$$Q_{in} = V_{1\text{-}4}/t_{1\text{-}4} \quad (10)$$

Also an estimate of the current inflow and outflow could be continuously displayed.

Multiple Switch Method (More Than Two Switches)

With the addition of an extra switch or switches to the wet well, it is possible to carry out the techniques previously described for the two switch method and check for the occurrence of lock-on. Lock-on would avoid detection by the sudden high inflow change detector of the two switch method. Lock on is detected by making at least two inflow measurements from the fill time of wet well sub-volumes and comparing the inflow values.

Figure 7:
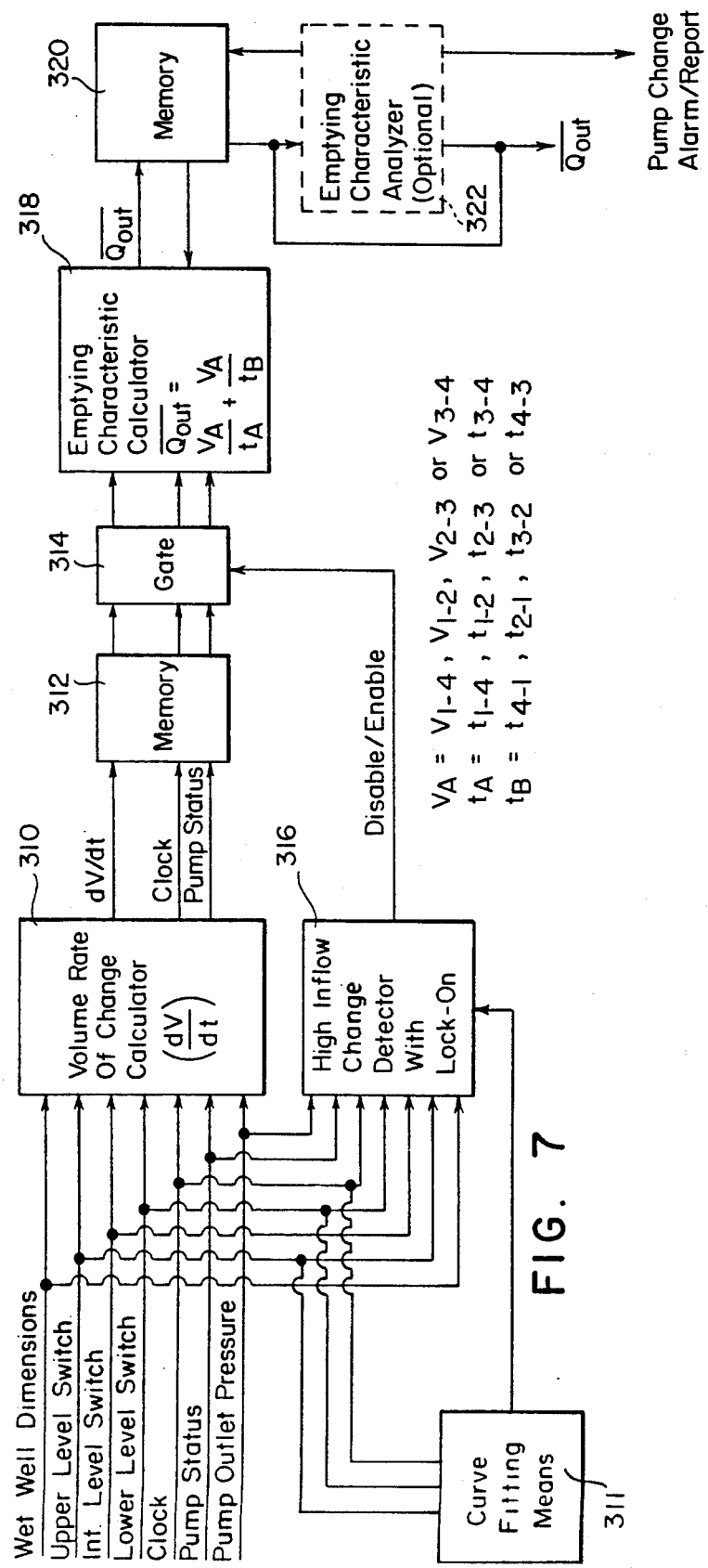

Referring to FIG. 6, four level switches $l_1$, $l_2$, $l_3$, $l_4$ provide intermediate level signals which are input to the system of FIG. 7. Inputted to the volume rate of change calculator 310 are wet well dimensions, upper level switch, intermediate level switch (or switches), lower level switch, clock, and pump status. Optionally, pump outlet pressure is input and passed on as well in the cases previously described. Outputted from calculator 310 is the volume divided by time for the most recent level increment, the clock, and the pump status which passes through gate 314 when allowed to by an able/disable signal coming from sudden high inflow change detector 316. Memory 312 stores outputs from calculator 310 for future use. The sudden high inflow change detector 316 accepts the same inputs as the volume rate of change calculator. The sudden high inflow change detector in this embodiment operates in the same manner as the embodiment of FIG. 3, but it additionally checks for lock-on. The addition of intermediate switches provides for additional intermediate volumes and their fill times can be used to calculate intermediate inflows. It also checks for lock-on—i.e., the condition that occurs when the pump cycle and the input flow cycle are in phase with each other at frequencies that are multiples of each other. When this occurs it can cause significant erroneous estimation of the inflow during the pump on time. Points which pass the high frequency test of the two switch embodiment are sent through a further test: it is checked whether the inflow estimates for the current pump cycle are equal within a user or manufacturer specified tolerance. If they are not, then lock-on is occurring and the high frequency detector disables gate 314.

The output of gate 314 is given a volume divided by its fill time, the clock, and the pump status. These signals are inputted to calculator 318 along with the pump outlet pressure which is necessary for good accuracy if the pump delivers flow to a pressurized pipe instead of an open channel. The memory 320 communicates directly with the emptying characteristics calculator 318. Here the average outflow is equal to the wet well sub-volume divided by $t_a$ (which is the time of the particular intermediate volume fill-up) plus the same sub-volume divided by its empty time ($t_b$), analogous to equation 7. The particular volume used depends on the number of switches in the wet well and the current point in the wet well cycle. Normally, the sub-volume will be selected so that the inflow measurement is made immediately before or after the pump on time. The calculated outflow is fed back and forth between the calculator 318 and the memory 320, and a collection of data points are stored for use to determine the average emptying characteristics of the pump.

The output of the memory module 320 is the emptying characteristics which are supplied are output directly, or pass through the optional emptying characteristics analyzer 322.

The emptying characteristics analyzer performs the same functions described in a previous embodiment.

Another feature which could be implemented due to the extra level switch or switches is the provision of means 311 for the storage and best curve fitting of the inflow measurements to improve sudden high inflow change detection or to allow better estimates of the current inflow. Better estimates of the inflow could be used with the same general techniques already descibed to give more accurate emptying characteristics.

End Point Method

Figure 8:
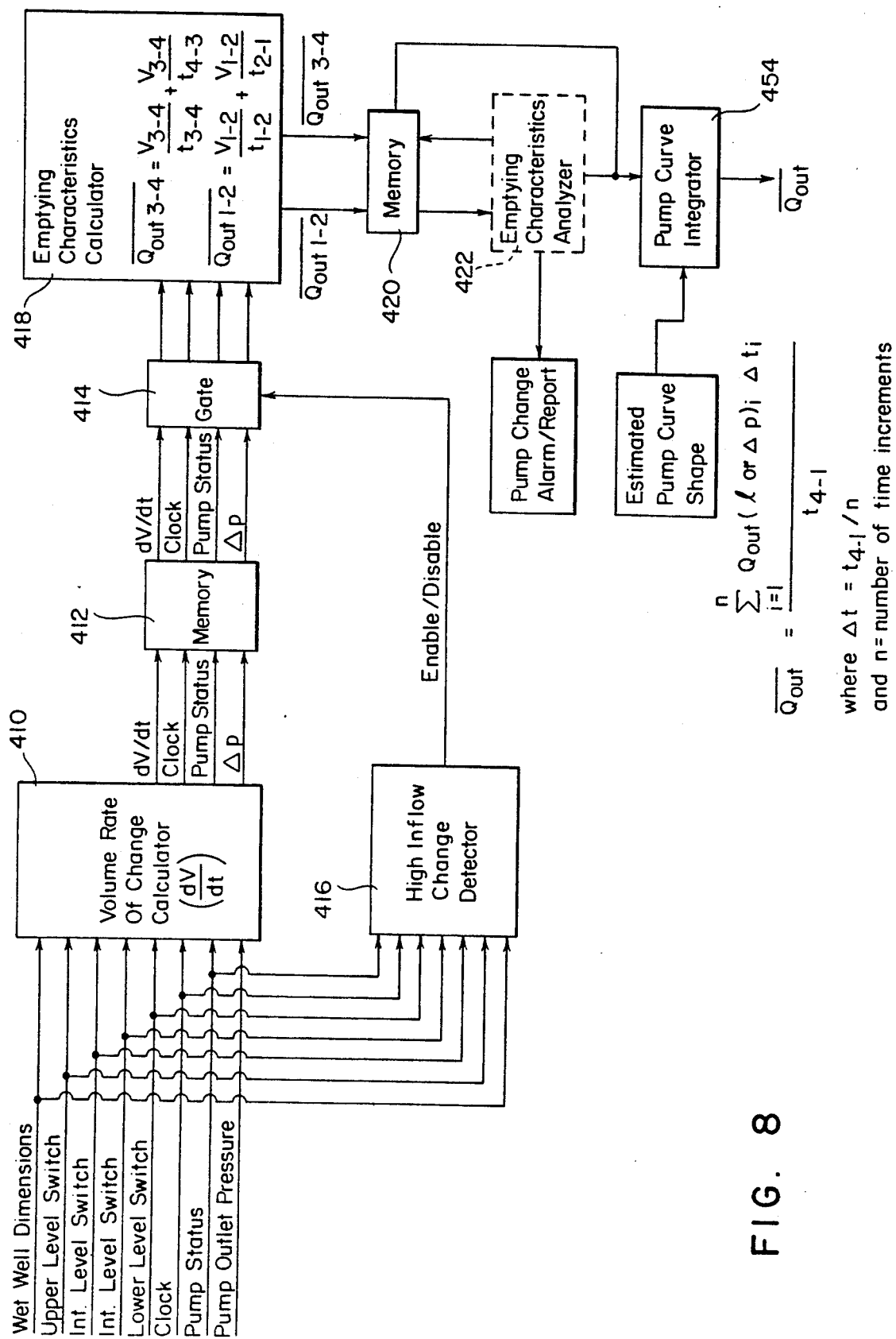
FIG. 8 is a block diagram of a modification of the system of FIG. 7 including pump curve end point detection.

In the modification of FIG. 8, the inputs to the volume rate of change calculator 410 include the wet well dimensions, the upper limit switch, upper intermediate switch, lower intermediate switch, lower limit switch, clock and the pump status, and optionally, the pump outlet pressure. These same inputs are inputted into the sudden high inflow change detector 416, (except the pump outlet pressure) which operates in the same manner as previously described in connection with FIG. 3. The output of emptying characteristic calculator 418 calculates flow for this system with the location of the switches and the nomenclature for the time and volumes as depicted in FIG. 6.

The embodiment of FIG. 8 uses inflow measurements made from the fill time of two sub-volumes to locate the end position and calibrate a pump curve. The pump curve is used to determine an average outflow for the pump (or pumps) and the volume per cycle is calculated by equation 8. Alternately, one intermediate switch could be used to define one sub-volume adjacent to the uppermost or lowermost level switch. This single sub-volume could be used to position and calibrate the pump curve using one end point of the pump curve.

If two intermediate switches are placed adjacent the top and bottom level switches, then inflow measurements can be made immediately before and after the pump flow measurements. In this situation, the inflow and outflow measurements are made at nearly the same time and only very high sudden inflow changes would be error sources. Therefore, it is possible to use this method without using a sudden high inflow change detection scheme. Inflow is not directly used in calculating the volume through the wet well. Instead, the intermediate inflow rates are used to develop the pump curve, and the pump curve is used to calculate the volume through the wet well.

The flow is calculated as follows: Upper outflow equals the upper intermediate volume ($V_{3-4}$) divided by its fill time ($t_{3-4}$) plus the upper intermediate volume ($V_{3-4}$) divided by its empty time ($t_{4-3}$). The lower outflow equals the lower intermediate volume ($V_{1-2}$) divided by the fill time of that volume ($t_{1-2}$) plus the same volume ($V_{1-2}$) divided by its empty time ($t_{2-1}$). Thus, this technique provides for the accumulation of upper points on the pump curve and lower points on the pump curve, and monitoring any changes which occur in the pump performance curve.

As previously stated, pumps have curves that are a function of level, transmitting more flow when the level is high in the wet well than when the level is low (see FIG. 9). The pump performance curve is a plot of the pump flow versus the wet well level (l), or pressure difference across the pump ($\Delta p$). Determining a current upper curve point and a lower curve point allows for tracking changes in the characteristic curve after each pump cycle, and when these two points are joined by the manufacturer's supplied pump curve (or some other assumed or typical behavior) an accurate estimate of the current pump curve is obtained and can be used for calculating the average pump flow. Thus, the output of calculator 418 has two way communication to memory 420 which stores appropriate data that is allowed by high frequency detector 416. The averaging of these upper points and lower points is done through the memory 420 and the calculator 418. These averaged points become the end points for the assumed pump curve (FIG. 9) which is supplied to the pump curve integrator 454, whereby the average pump output or emptying characteristic is supplied out of integrator 454. It should be noted that integrator 454 has as an input an estimated pump curve shape obtained from the manufacturer's suggested curve, a measured curve, or a "rough estimate" of the curve.

The emptying characteristics are recorded in the form of average outflow values. The average outflow is obtained as follows: once the pump curve is known and an estimate of the inflow is available, then the level in the wet well can be predicted for any particular time as the level falls during the pump on time, and hence the outflow as a function of level can be converted to the outflow as a function of time. At this point, the average outflow can be calculated from:

$$\overline{Q_{out}} = \left( \sum_{i=1}^{n} Q_{out}(t)_i \cdot \Delta t \right) / t_{4-1} \qquad (11)$$

where
$\Delta t = t_{4-1}/n$
and n = number of time increments

Continuous Level Method

Figure 13:
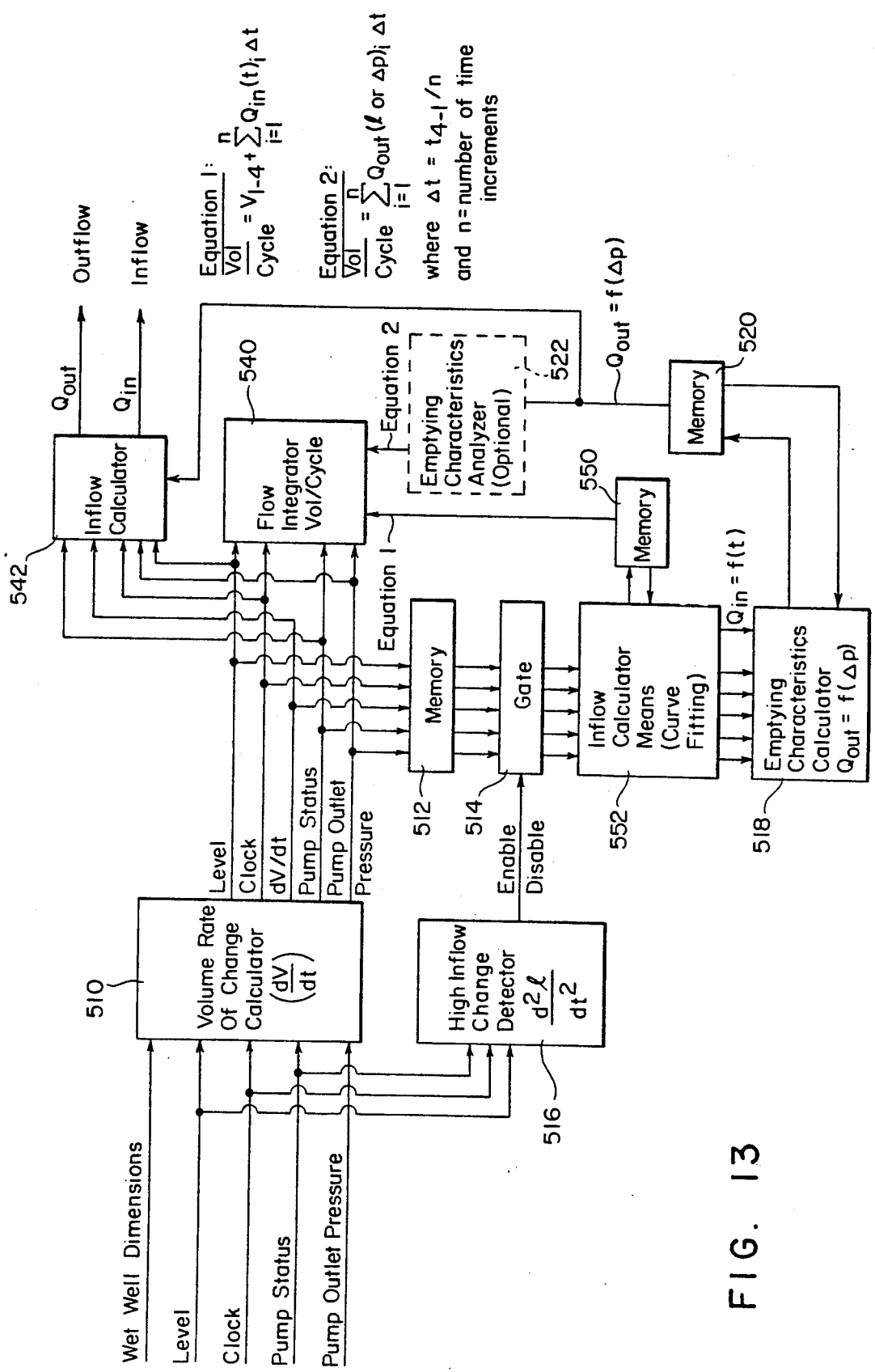
FIG. 13 illustrates a continuous level detecting flow measuring system corresponding to FIG. 12.

According to the preferred embodiment of the invention shown in FIGS. 12-16, a continuous level sensing system (FIG. 12) is provided for measuring emptying characteristics and three alternate techniques for continuous level measurements are shown. Referring to FIG. 13, the inputs to volume rate of change calculator 510 include a clock signal, a level sensor, wet well dimensions, and the differential pressure across the pump for the cases previously described, and the status of the wet well pumps. Pump status takes the form of signals which allow the meter to determine whether each pump is on or off at any particular moment and percent of maximum speed for variable speed pumps. Level and pump status are read continuously or regularly over short time increments so that the information is nearly continuously collected. The volume rate of change calculator 510 also has access to clock information so that it can determine when any pump is turned on or off, and so that it can know the time increments between level measurements. Wet well dimensions allow the module to determine the incremental volume change for a given incremental level change and allow measurements of dl/dt to be converted to dV/dt. The calculator 510 calculates and outputs the rate of change of the volume of liquid in the wet well from the available inputs. One method for doing this is to use a finite difference formula on a record of the time and corresponding level in the wet well. These formulae allow one to sample the level periodically and using an algebraic equation, calculate a very accurate estimate of dl/dt and hence dV/dt is known very accurately as well. In fact, the estimate of dl/dt (and dV/dt) can be made as accurate as desired by using more points and/or decreasing the time increment between level measurements. During the wet well fill times, dV/dt equals the inflow. Because the level is measured continuously, the system is not limited to measuring inflow over only a few segments (as when discrete level switches are used). Because the segments are very small, the inflow values calculated are not averages over a relatively long period of time (as when discrete level switches are used).

The calculator 510 also passes along its input information to downstream modules.

Memory 512 stores data for later use, such as the level (or pressure across the pump, $\Delta p$), the rate of change of volume, or the pump speed for variable speed pumps as well as the time at which these values were recorded. This stored data is necessary for performing the curve fits of inflow which extend over two wet well cycles and for calculating the emptying characteristics which requires data over many past time increments. The system is designed so that the modules which carry out the analysis of the stored data control the removal of old or unneeded stored data.

Because the inflow is measured at many times before and after the pump on time, a very accurate and detailed account of the actual inflow behavior is available, whenever the pump is not on.

At low frequencies, this information is sufficient to allow excellent interpolation of the data as can be seen from FIG. 10. A spline or polynomial fit of the inflow data before and after the pump on time will give very accurate estimates of the inflow while the pump is on for the case shown in FIG. 10. However, if the case of FIG. 11 were to occur, the best fit would give poor estimates of inflow during the pump on time. A characteristic of the inflow of FIG. 11 is that it passes through a minimum and maximum and each of these would cause a POI in a plot of level versus time. In fact, it is the occurrence of a POI which makes a curve fit inaccurate, and conversely, if there is no POI, the curve fit will be very accurate.

The sudden high inflow change detector 516 accepts the same data as calculator 510 except for the wet well dimensions and the pump outlet pressure. According to a characterizing feature of this embodiment when a pump is on, the sudden high inflow change detector calculates the acceleration of the level (i.e., the second derivative of level with respect to time) from the input data. One way to calculate the second derivative is to use a finite differencing formula on a record of level versus time. Referring to FIGS. 15 and 16, if the second derivative of level changes sign while the pump is on (a point of inflection in the level), then sudden high inflow change inflow events are occurring and a sudden high inflow change indicating alarm is set off (FIG. 15). But if the inflow is monotonically increasing or decreasing, no point of inflection will occur in a level versus time plot as shown in FIG. 16.

Figure 14:
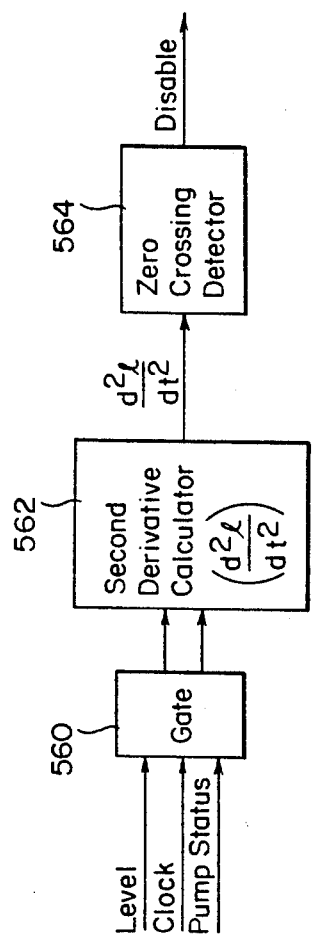
FIG. 14 is a block diagram of the sudden high change of inflow detector of FIG. 13.

The structural details of the high frequency detector 516 are shown in FIG. 14 wherein gate 560 is responsive to pump input status and, if the pump is on, passes the level and clock signals to calculator 562, which differentiates the level with respect to time twice, thereby obtaining the second derivative of level. The second derivative is the rate of change of the rate of change of the level, or the acceleration of level. The second derivative of level is output to a zero crossing detector or comparator 564 which examines sequential values of $d^2l/dt^2$ to see if a point of inflection (POI) in the level versus time has occurred. A point of inflection is defined as a point (FIG. 15) where the second derivative changes sign (polarity). A point of inflection indicates that the inflow has changed from increasing to decreasing or from decreasing to increasing. A point of inflection indicates that the inflow is changing at a rate which is high enough to lead to errors in interpolated inflows. If the second derivative changes sign between time increments, then a POI has just occurred and the inflow is not suitable for applying a best fit to the inflow data points. Comparator 564 outputs a disable signal which disables gate 514 (FIG. 13) and prevents calculation of the wet well emptying characteristics for the current wet well cycle. If sudden high change inflow is not detected, then gate 514 allows inflow calculator 552 to operate on a record of the dV/dt (inflow) versus time (for times when the pump was not on) which was previously stored in memory 512. The inflow calculator 552 carries out curve fitting which will deliver a record of inflow as a function of time and allow interpolation of the inflow during the time that the pump was on. This function has been made more valuable by the sudden high inflow change detector by eliminating the possibility that sudden high inflow changes have marred its accuracy. If high frequency is detected, the fit will not be carried out. For low frequency cases, the inflow as a function of time is stored in memory 550 and made available to calculator 518.

At low frequencies, calculator 518 uses a record of dV/dt and level (or $\Delta p$) versus time while the pump or pumps are on, along with the best fit equation which gives the inflow as a function of time during the pump on time. From this information, the outflow for each time increment during the pump on time can be calculated by using the formula:

$$(Q_{out})_t = (dV/dt)_t + (Q_{in})_t \quad (12)$$

where the subscript "t" indicates that the values are known at the particular time increment or come from the time record in memory. Because the record of level (or $\Delta p$) for each time increment is known as well, the outflow for each particular time can be attributed to a level, allowing the outflow to be converted to a function of level (or $\Delta p$).

$$(Q_{out})_t \rightarrow (Q_{out})l \text{ or } \Delta p \quad (13)$$

Once developed, the outflow as a function of level (or $\Delta p$) is stored in memory 520.

After many wet well fill and empty cycles have passed, memory 520 has many records of the outflow as a function of level (or $\Delta p$) and they may not all match each other. Pump performance may change in the long or short term, owing to pump impeller wear or clogging of the outlet for example. The optional emptying characteristics analyzer 522 examines the outflow data in memory 520 and outputs information on the pump performance. Also, it determines what function best characterizes the pump performance at that given time. If the emptying characteristics analyzer is not used, then the most recently developed emptying characteristic or a running average of the emptying characteristics over many pump cycles is used.

At sudden high inflow changes, flow integrator 540 uses a record of wet well level (or $\Delta p$) versus time while the pump or pumps are on, together with the emptying characteristics developed during previously occurring low frequency inflows, to calculate the volume of liquid which passed through the wet well during the last wet well cycle. This is done using the outflow as a function of level or pressure difference and a numerical version of equation 4 of the following form:

$$\text{Volume/cycle} = \sum_{i=1}^{n} Q_{out}(l \text{ or } \Delta p)_i \Delta t \quad (14)$$

where $\Delta t = t_{+1}/n$, and $n =$ number of time increments.

Optionally, if the inflow is found to be of low frequency, the inflow as a function of time may be substituted into a numerical version of equation 2 of the following form:

$$\text{Volume/cycle} = V_{1-4} + \sum_{i=1}^{n} Q_{in}(t)_i * \Delta t \quad (15)$$

where $\Delta t$ and n are defined above.

Inflow calculator 542 is necessary to output the inflow in the case of sudden high change of inflows when the curve fitted inflow as a function of time would not be accurate. Inflow calculator 542 uses a record of dV/dt and level (or $\Delta p$) versus time along with the outflow as a function of level (or $\Delta p$) to calculate the inflow using equation (1). At this point the inflow, outflow and the volume through the wet well per cycle are known.

The pump performance data is generated each time that there is no POI during the pump on time. In most applications, this will be the normal situation and high frequency flow will be the exception. When there is no POI, both equation (15) and equation (14) can be used and the results compared, averaged, etc.

It should be noted that the same quantities can be calculated and presented in a "real time" manner by using the most recent dV/dt, and emptying characteristics function.

If the pump station uses variable speed pumps, then the emptying characteristics must account for another pump status variable, the pump impeller rotation speed. In this case the outflow is found as a function of both percent maximum speed and the wet well level or $\Delta p$.

While in accordance with the Patent Statutes, the preferred forms and embodiments of the invention have been illustrated and described, various changes may be made without deviating from the inventive concepts set out above.

What is claimed is:

1. Apparatus for determining the emptying characteristics of a wet well system (4), including a source of liquid (2) discharging into the wet well to fill the same, pump means (8) for pumping liquid out of the wet well, a source of pump status signals, means for generating a clock signal, and level sensing means for producing level signals corresponding with the level of the liquid at any given time;

the improvement which comprises:
(a) volume rate of change calculator means (310, 410, 510) for calculating a signal corresponding with the volume rate of change relative to time (dV/dt);
(b) emptying characteristics calculator means (318, 418, 518) for calculating the emptying characteristics of the system as a function of said volume rate of change level, clock and pump status signals;
(c) memory means (320, 420, 520) for storing said emptying characteristics;
(d) gate means (314, 414, 514) operable between enabled and disabled conditions for connecting said volume rate of change calculator means with, and disconnecting said volume rate of change calculator means from, said emptying characteristics calculator means, respectively; and
(e) sudden high inflow change detector means (316, 416, 516) for operating said gate means to the disabled condition when the rate of inflow into the wet well suddenly changes above a predetermined value.

2. Apparatus as defined in claim 1, wherein said level sensing means includes upper ($l_1$) and lower ($l_2$) level sensing means, and further wherein said sudden high inflow change detector means includes curve fitting means (311) for analyzing pairs of fill time and emptying time values relative to each other to define a best fit curve, and to reject those pairs of fill time and emptying time values that are outside of a predetermined range relative to said best fit curve, said wet well characteristics being calculated in accordance with the equation:

$$Q_{out} = V_{1-4}/t_{1-4} + V_{4-1}/t_{4-1}$$

where $V_{1-4}$ and $V_{4-1}$ equals the volume of the wet well between the sensed lower and upper levels, $t_{1-4}$ equals the fill time, and $t_{4-1}$ equals the pump-on time.

3. Apparatus as defined in claim 1, wherein said level sensing means includes means ($l_2$) for detecting at least one intermediate level; wherein said calculator means (318) for calculating the wet well emptying characteristics is operable in accordance with the equation:

$$Q_{out} = V_A/t_A + V_A/t_b$$

where $V_A$ is the volume defined by said intermediate level sensing means and another of said sensing means, $t_a$ is the fill time for said volume, and $t_b$ is the emptying time for said volume; wherein said volume rate of change calculator means is operable to provide first and second volume rate of change signals (dV/dt) that are a function of the rate of change of the volume of liquid in the wet well with respect to time during at least two portions of the wet well fill time, respectively, and a third volume of rate signal that is a function of the rate of change of the volume of liquid during at least a portion of the pump on time; and further wherein said sudden high inflow change detector means is operable to compare said first and second signals and to generate a disable signal when the difference between said first and second signals exceeds a given value.

4. Apparatus as defined in claim 1, wherein said level sensing means includes means ($l_2$, $l_3$) for detecting at least one intermediate level; and further wherein said emptying characteristics calculator means (418) is operable to calculate from at least one of said pump on signals and from at least one of said pump off signals at least one outflow value for a corresponding level value in accordance with the formula:

$$Q_{out} = V_A/t_A + V_A/t_B$$

where $V_A$ is the volume defined by two of the said level switches, thereby to define at least one point on the characteristic pump flow curve (FIG. 9), said emptying characteristic calculator being operable to independently average first and second outflows over more than one wet well cycle.

5. Apparatus as defined in claim 1, and further including curve fitting means (552) for producing an interpolated inflow signal ($Q_{in}$) as a function of time during the pump on time, said wet well emptying characteristics calculating means being operable as a function of the differential pressure across the pump; said detector means being responsive to a predetermined sudden inflow change for isolating said curve fitting means from said rate of change calculator means, said detector means including:

(1) second derivative calculator means (562) for obtaining the second derivative of level with respect to time ($d^2l/dt^2$); and (2) zero crossing detector means (564) for detecting a point of inflection in the level and thereby indicate said sudden inflow change.

6. Apparatus as defined in claim 1, and further including flow integrator means (540) for calculating the liquid volume per wet well cycle as a function of the level, clock, pump status and outlet pressure signals.

7. Apparatus as defined in claim 1, and further including inflow calculator means (542) for calculating the inflow as a function of the level, clock and pump status signals.

8. Apparatus as defined in claim 1, and further including emptying characteristic analyzer means (522) for calculating pump performance as a function of the wet well emptying characteristics.

9. Apparatus for determining the emptying characteristics of a wet well (4) including a source of liquid (2) discharging into the wet well to fill the same, pump means (8) for pumping the liquid out of the wet well, a source of pump status signal, a source of clock signals, a continuous level sensor for making the level measurements, and means for detecting the differential pressure across the inlet and outlet sides of the wet well pump means, comprising:

(a) volume rate of change calculator means (510) responsive to the dimensions of said wet well, said level detecting means, and said clock signals for providing a first signal (dV/dt) that is a function of the rate of change of the volume of liquid in the wet well with respect to time during at least some portion of the wet well fill time;

(b) curve fitting means (552) for producing an interpolated inflow signal ($Q_{in}$) as a function of time during the pump on time;

(c) calculator means (518) responsive to said inflow signal for calculating the wet well emptying characteristics ($Q_{out}$) as a function of the differential pressure across the pump;

(d) gate means (514) connecting said volume rate of change calculator means with said emptying characteristics calculating means, said gate means being operable between enabled and disabled conditions;

(e) means including a memory (520) for storing said emptying characteristics; and (f) detector means (516) responsive to a predetermined sudden inflow change for operating said gate means to said disabled condition thereby isolating said curve fitting means from said rate of change calculator means, said detector means including:

(1) second derivative calculator means (562) for obtaining the second derivative of level with respect to time ($d^2l/dt^2$); and (2) zero crossing detector means (564) for detecting a point of inflection in the level and thereby indicate said sudden inflow change.

10. Apparatus as defined in claim 9, and further including:

inflow integrator means (540) for producing a volume per cycle signal in response to the outflow signal from said emptying characteristics calculator (518), said pump status signals, said clock signals, and said level signals, and to the inflow signal from said inflow calculator means (552), for producing a volume per cycle signal in accordance with the equation:

$$\text{volume/cycle} = V_{1-4} + \sum_{i=1}^{n} Q_{in}(t)_i * \Delta t$$

11. Apparatus as defined in claim 9, and further including:
inflow integrator means (540) for producing a volume per cycle signal in response to the outflow signal from said emptying characteristics calculator (518), said pump status signals, said clock signals, said pump outlet pressure signals, and said level signals, and to the inflow signal from said inflow calculator means (552), for producing a volume per cycle signal in accordance with the equation:

$$\text{volume/cycle} = \sum_{i=1}^{n} Q_{out}(\Delta p)_i * \Delta t$$

12. Apparatus as defined in claim 11, and further including inflow calculator means (542) for producing an inflow signal as a function of said level, clock, pump status and volume rate of change signals.

13. Apparatus as defined in claim 12, and further including pump analyzer means (522) for determining pump performance as a function of time.

* * * * *